United States Patent
Watanabe et al.

(10) Patent No.: US 10,830,339 B2
(45) Date of Patent: Nov. 10, 2020

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi-ken (JP); Munetoshi Makimura, Aichi-ken (JP); Koji Imai, Aichi-ken (JP); Yohei Nakano, Aichi-ken (JP); Kazuhiro Saito, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 16/230,309

(22) Filed: Dec. 21, 2018

(65) Prior Publication Data

US 2019/0211918 A1 Jul. 11, 2019

(30) Foreign Application Priority Data

Jan. 5, 2018 (JP) .................................. 2018-000841

(51) Int. Cl.
- *F16H 59/10* (2006.01)
- *B60K 20/06* (2006.01)
- *F16H 61/22* (2006.01)

(52) U.S. Cl.
CPC ........... *F16H 59/105* (2013.01); *B60K 20/06* (2013.01); *F16H 61/22* (2013.01)

(58) Field of Classification Search
CPC .... F16H 59/10; F16H 59/105; F16H 59/0217; F16H 59/044; F16H 2061/223; F16H 63/42; F16H 2059/0282; F16H 2059/0295; B60K 20/00; B60K 20/06; Y10T 74/20146; Y10T 74/20152; Y10T 74/20159; Y10T 74/20018; Y10T 74/20085; Y10T 74/20091; Y10T 74/20104
See application file for complete search history.

(56) References Cited

U.S. PATENT DOCUMENTS

| 5,492,031 A * | 2/1996 | Hedderly ............... B60K 20/06 200/61.27 |
| 6,120,412 A * | 9/2000 | Fujinuma ........... F16H 59/0204 477/99 |
| 6,203,469 B1 * | 3/2001 | Fujinuma ........... F16H 59/0204 200/61.27 |
| 6,415,677 B1 | 7/2002 | Skogward |
| 6,443,026 B1 * | 9/2002 | Arakawa ............... B60K 20/06 192/220.2 |

(Continued)

FOREIGN PATENT DOCUMENTS

| JP | 2008057722 A | 3/2008 |
| WO | WO-2015152566 A1 * | 10/2015 ............ B60K 20/08 |

*Primary Examiner* — Bobby Rushing, Jr.
(74) *Attorney, Agent, or Firm* — Roberts Calderon Safran & Cole P.C.

(57) ABSTRACT

A shift device includes: a shift mechanism that is provided with a shift body that is movable to change a shift position; at least one rotation section that is provided at the shift mechanism and that is rotated about a center axis line of the rotation section; at least one moving section that is provided at the shift mechanism and that is moved; and a detection body that detects a rotation position of the rotation section and detects a movement position of the moving section.

4 Claims, 4 Drawing Sheets

(56) References Cited

U.S. PATENT DOCUMENTS

| | | | | |
|---|---|---|---|---|
| 6,532,842 B1* | 3/2003 | Arai | ..................... | B60K 20/06 |
| | | | | 74/473.1 |
| 6,945,132 B2* | 9/2005 | Kim | ................... | F16H 59/0204 |
| | | | | 74/335 |
| 7,552,659 B2* | 6/2009 | Komatsu | .............. | F16H 59/105 |
| | | | | 74/335 |
| 8,490,509 B2* | 7/2013 | Giefer | .................... | F16H 59/10 |
| | | | | 74/473.1 |
| 8,863,603 B2* | 10/2014 | Patzold | .............. | F16H 59/0204 |
| | | | | 74/473.25 |
| 8,955,405 B2* | 2/2015 | Heo | ....................... | F16H 59/04 |
| | | | | 74/473.18 |
| 9,334,949 B2* | 5/2016 | Fett | ........................ | F16H 59/08 |
| 9,835,245 B2* | 12/2017 | Lee | ......................... | F16H 59/08 |
| 9,845,868 B2* | 12/2017 | Lee | ......................... | F16H 59/08 |
| 2003/0205100 A1* | 11/2003 | Vermeersch | ...... | B60R 25/02144 |
| | | | | 74/473.32 |
| 2009/0139850 A1* | 6/2009 | Urakawa | ............. | B60Q 1/1469 |
| | | | | 200/6 A |
| 2010/0024584 A1* | 2/2010 | Giefer | ................ | F16H 59/0204 |
| | | | | 74/473.18 |
| 2016/0053890 A1* | 2/2016 | Hathaway | .............. | F16H 63/48 |
| | | | | 701/53 |
| 2016/0290495 A1* | 10/2016 | Bak | ....................... | F16H 59/105 |
| 2017/0045125 A1* | 2/2017 | Kawame | ................ | F16H 61/32 |
| 2017/0122429 A1* | 5/2017 | Kvarnstrom | ........ | F16H 59/0204 |

\* cited by examiner

SHIFT DEVICE

CROSS-REFERENCE TO RELATED APPLICATION

This application claims priority under 35 USC 119 from Japanese Patent Application No. 2018-000841 filed Jan. 5, 2018, the disclosure of which is incorporated by reference herein.

BACKGROUND

Field of the Disclosure

The present disclosure relates to a shift device in which a shift body is moved to change a shift position of the shift body.

Related Art

Japanese Patent Application Laid-Open (JP-A) No. 2008-57722 discloses a shift switching device in which a swing position of a shift lever is detected by a sensor, and a swing position of a leading end portion of the shift lever with respect to a trunk portion is detected by a contact member of the trunk portion and a contact member of the leading end portion.

In such a shift switching device, it is desirable to be able to detect a movement position of the shift lever or the like with a simple configuration.

SUMMARY

In consideration of the above circumstances, an object of the present disclosure is to obtain a shift device capable of detecting a rotation position of a rotation section and a movement position of a moving section with a simple configuration.

A shift device of a first aspect of the present disclosure includes a shift mechanism that is provided with a shift body that is movable to change a shift position, at least one rotation section that is provided at the shift mechanism and that is rotated about a center axis line of the rotation section, at least one moving section that is provided at the shift mechanism and that is moved, and a detection body that detects a rotation position of the rotation section and detects a movement position of the moving section.

A shift device of a second aspect of the present disclosure is the shift device of the first aspect of the present disclosure, wherein the shift body is movable to rotate the rotation section or the moving section about the center axis line.

A shift device of a third aspect of the present disclosure is the shift device of the first aspect or the second aspect of the present disclosure, wherein the moving section is movable to move the shift body.

A shift device of a fourth aspect of the present disclosure is the shift device of any one of the first aspect to the third aspect of the present disclosure, wherein the shift body is movable in one direction to change the shift position of the shift body, and the shift body is movable in another direction to move the moving section.

A shift device of a fifth aspect of the present disclosure is the shift device of any one of the first aspect to the fourth aspect of the present disclosure, wherein the moving section is movable to restrict movement of the shift body.

A shift device of a sixth aspect of the present disclosure is the shift device of any one of the first aspect to the fifth aspect of the present disclosure, wherein the detection body is disposed along the center axis line of the rotation section.

In the shift device of the first aspect of the present disclosure, the shift body is provided to the shift mechanism, and the shift body is movable to change the shift position of the shift body. The at least one rotation section of the shift mechanism is rotated about the center axis line, and the at least one moving section of the shift mechanism is moved.

Note that the detection body detects the rotation position of the rotation section and the movement position of the moving section. This enables the rotation position of the rotation section and the movement position of the moving section to be detected with a simple configuration.

In the shift device of the second aspect of the present disclosure, the shift body is movable to rotate the rotation section or the moving section about the center axis line. The detection body detects the rotation position of the rotation section or the moving section, thereby enabling the movement position of the shift body to be detected.

In the shift device of the third aspect of the present disclosure, the moving section is movable to move the shift body. The detection body detects the movement position of the moving section, thereby enabling the movement position of the moving section to be detected, even in cases in which the moving section is moved separately to the shift body.

In the shift device of the fourth aspect of the present disclosure, the shift body is moved in the one direction to change the shift position of the shift body.

Note that the shift body is movable in the other direction to move the moving section. The detection body detects the movement position of the moving section, thereby enabling the movement position of the shift body in the other direction to be detected.

In the shift device of the fifth aspect of the present disclosure, the moving section is movable to restrict movement of the shift body. The detection body detects the movement position of the moving section, thereby enabling the situation regarding a movement restriction on the shift body to be detected.

In the shift device of the sixth aspect of the present disclosure, the detection body is disposed parallel to the center axis line of the rotation section. This enables a placement dimension in the direction in which the rotation section and the detection body oppose each other to be made smaller.

BRIEF DESCRIPTION OF DRAWINGS

An exemplary embodiment will be described in detail with reference to the following figures, wherein.

DETAILED DESCRIPTION

Figure 1:
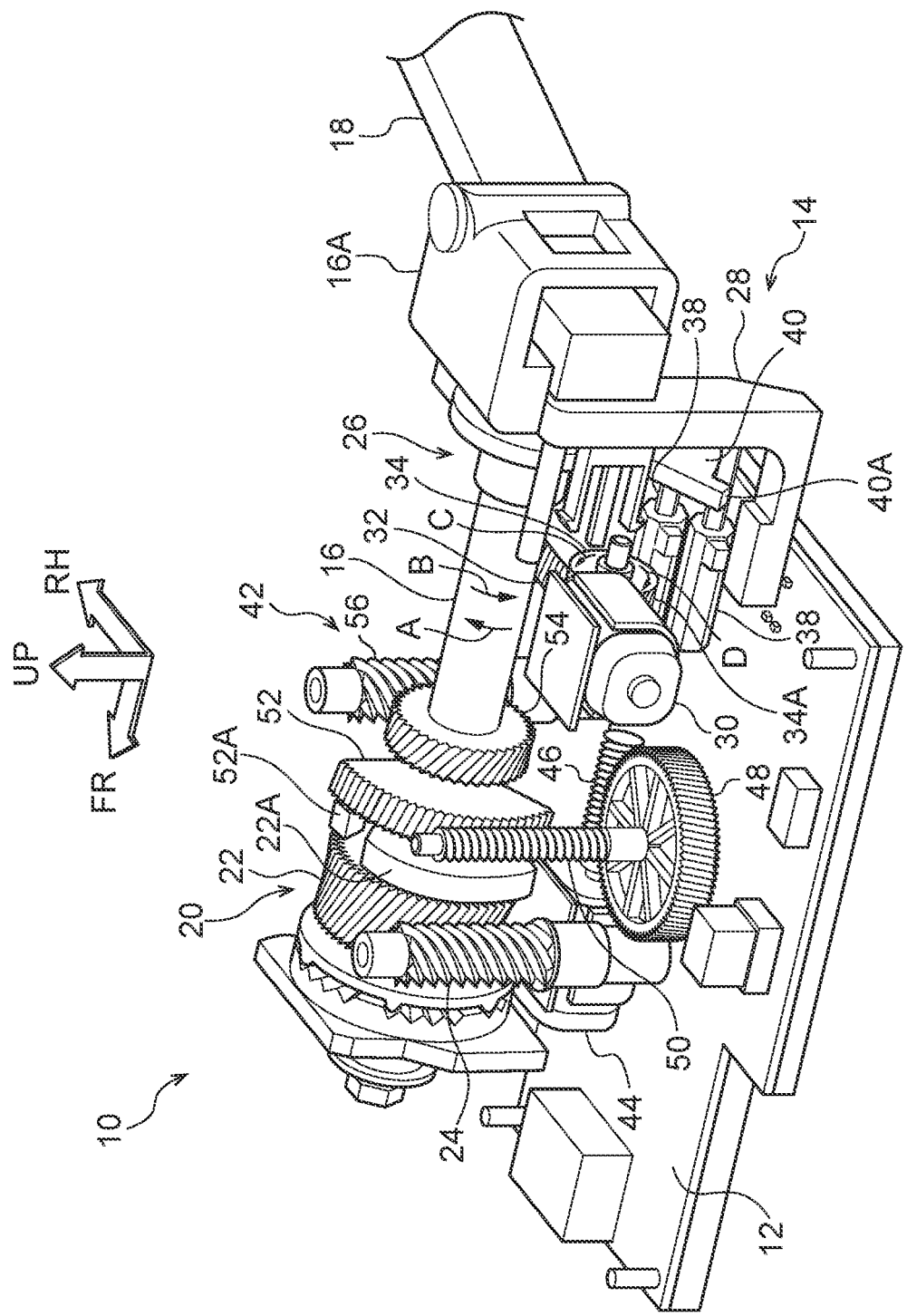
FIG. 1 is a perspective view illustrating a shift device according to an exemplary embodiment of the present disclosure, as viewed from the oblique rear left.
Figure 2:
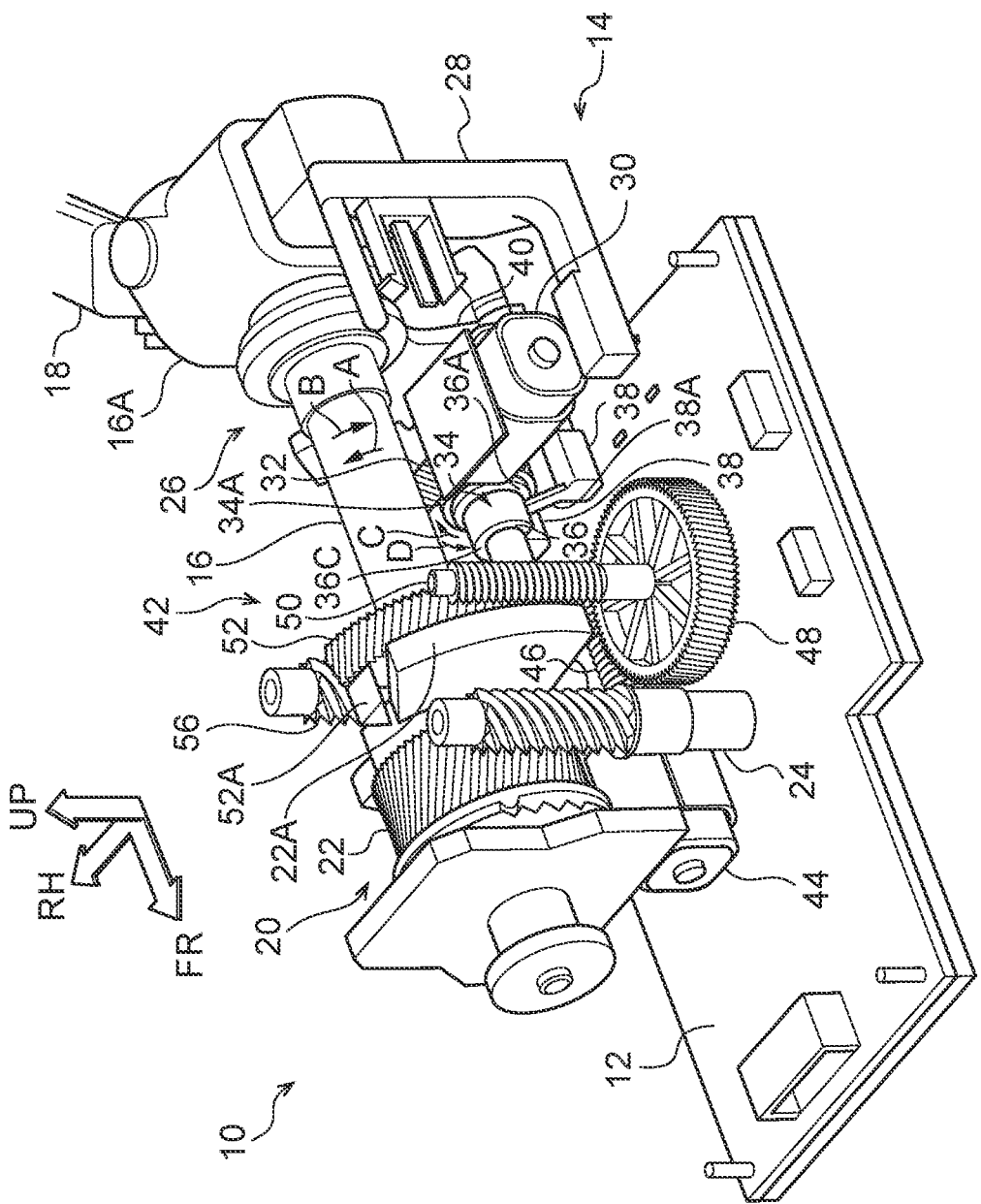
FIG. 2 is a perspective view illustrating a shift device according to an exemplary embodiment of the present disclosure, as viewed from the oblique front left.
Figure 3:
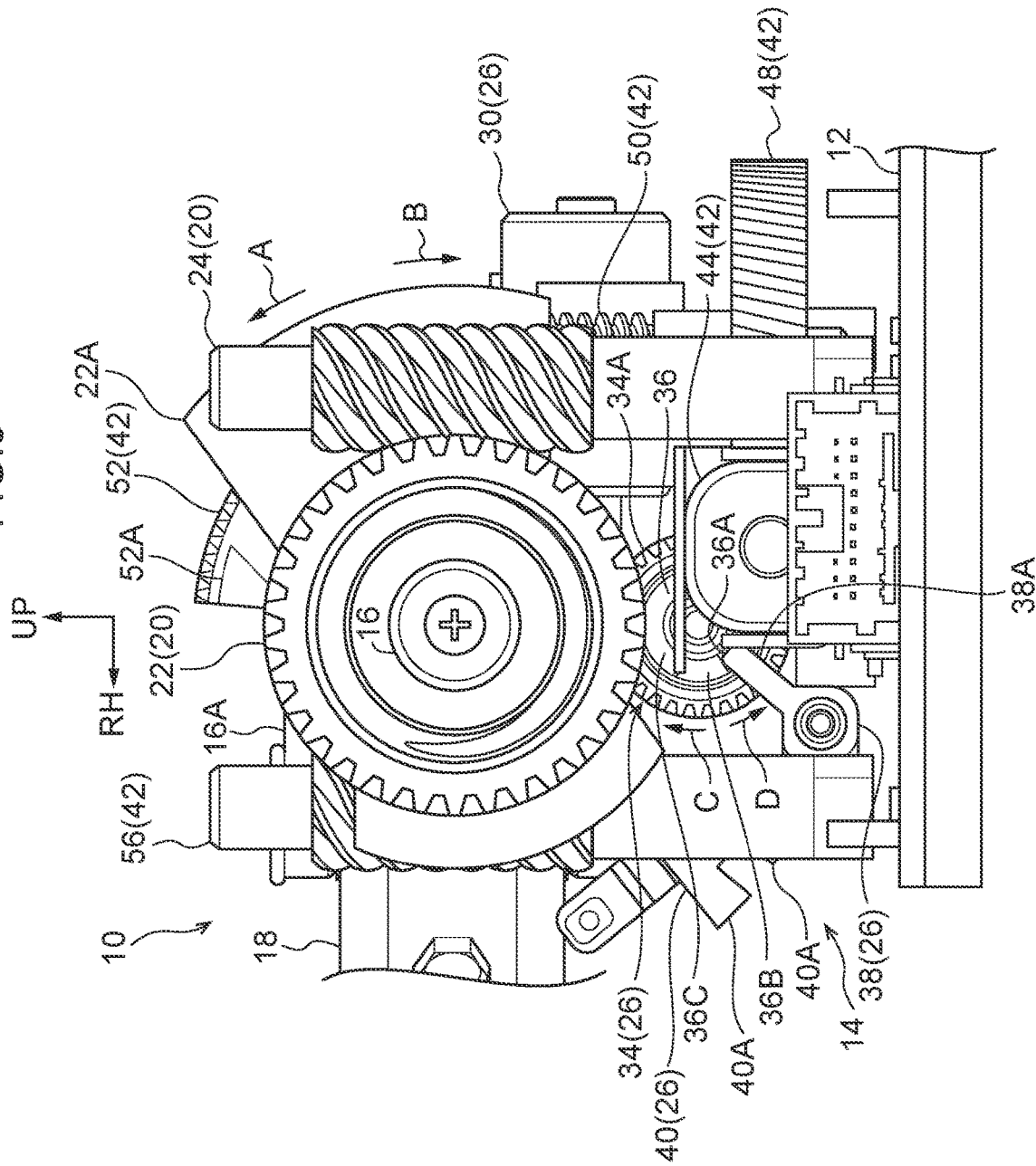
FIG. 3 is a front view illustrating a shift device according to an exemplary embodiment of the present disclosure, as viewed from the front.

FIG. 1 is a perspective view illustrating a shift device 10 according to an exemplary embodiment of the present disclosure, as viewed from the oblique rear left. FIG. 2 is a perspective view illustrating the shift device 10 as viewed from the oblique front left. FIG. 3 is a front view illustrating the shift device 10 as viewed from the front. Note that in the drawings, the arrow FR indicates the front of the shift device 10, the arrow RH indicates the right of the shift device 10, and the arrow UP indicates the upper side of the shift device 10.

The shift device 10 according to the present exemplary embodiment is what is referred to as a column type shift device, and is installed to a steering column of a vehicle. The front direction, right direction, and upward direction of the shift device 10 respectively correspond to an oblique front downward direction, a right direction, and an oblique front upward direction of the vehicle.

As illustrated in FIG. 1 to FIG. 3, a substantially rectangular plate shaped substrate 12 that includes magnetic sensors (not shown), serves as a detection body and a control body, and is provided at a lower end portion of the shift device 10. The substrate 12 is disposed so as to be perpendicular to the up-down direction. A vehicle brake (not illustrated in the drawings) is electrically connected to the substrate 12. A vehicle occupant (specifically, the driver) operates the brake to brake the vehicle.

A shift mechanism 14 is provided at an upper side of the substrate 12.

The shift mechanism 14 is provided with a substantially circular column shaped rotation shaft 16, serving as a rotation section and a moving section. The rotation shaft 16 is rotatably supported on a vehicle body side (rotatably or movably about a center axis line), and the axial direction of the rotation shaft 16 is disposed parallel to the front-rear direction. A rear end portion of the rotation shaft 16 is provided with a substantially rectangular tube shaped rotation tube 16A. The rotation tube 16A is capable of rotating as an integral unit with the rotation shaft 16, and the interior of the rotation tube 16A is open on both sides in a left-right direction.

The vicinity of a left end (base end) of a substantially elongated rod shaped lever 18, serving as a shift body, passes through the interior of the rotation tube 16A of the rotation shaft 16 from the right side. The lever 18 is supported by the rotation tube 16A so as to be capable of swinging in the up-down direction about the rotation tube 16A. The lever 18 is capable of swinging (moving) in a predetermined range in the up-down direction (one direction, shift direction) about the rotation shaft 16, and the lever 18 is also capable of swinging (moving) in a predetermined range in the front-rear direction (another direction, select direction) with respect to the rotation tube 16A. The lever 18 extends from the rotation tube 16A toward the right side, and extends so as to be capable of swinging in the up-down direction and the front-rear direction in a vehicle cabin. The lever 18 can be swing-operated in the up-down direction and the front-rear direction by an occupant gripping a right end portion (leading end portion) of the lever 18. Swing-operating the lever 18 from an upper side to a lower side changes a shift position of the lever 18 to, for example, a P position (parking position, predetermined shift position), an R position (reverse position), an N position (neutral position), and a D position (drive position), in this sequence. Moreover, when the lever 18 is swing-operated toward the lower side, the rotation shaft 16 is rotated in a forward direction (the arrow A direction in FIG. 1, etc.), and when the lever 18 is swing-operated toward the upper side, the rotation shaft 16 is rotated in a reverse direction (the arrow B direction in FIG. 1, etc.).

A detection device 20 is provided at the periphery of a front portion of the rotation shaft 16.

The detection device 20 is provided with a rotating gear 22, configured by a helical gear. The rotating gear 22 is coaxially fixed to a front end portion of the rotation shaft 16. A rear portion of the rotating gear 22 is integrally provided with a substantially sector-form plate-shaped rotating plate 22A. The rotating plate 22A is capable of rotating as an integral unit with the rotating gear 22, and projects toward the left side. A detection gear 24 configured by a helical gear meshes with the left side of the rotating gear 22, and the axial direction of the detection gear 24 is disposed parallel to the up-down direction. When the lever 18 is swung in the up-down direction, the rotating gear 22 is rotated as an integral unit with the rotation shaft 16, thereby rotating the detection gear 24.

A lower end portion of the detection gear 24 is disposed directly above the substrate 12. The substrate 12 detects a rotation position of the detection gear 24 (a rotation position of a magnet fixed to the lower end portion of the detection gear 24). The rotation positions of the rotating gear 22 and the rotation shaft 16 are detected to detect the swing position of the lever 18 in the up-down direction, and the shift position of the lever 18 is thereby detected.

Figure 4:
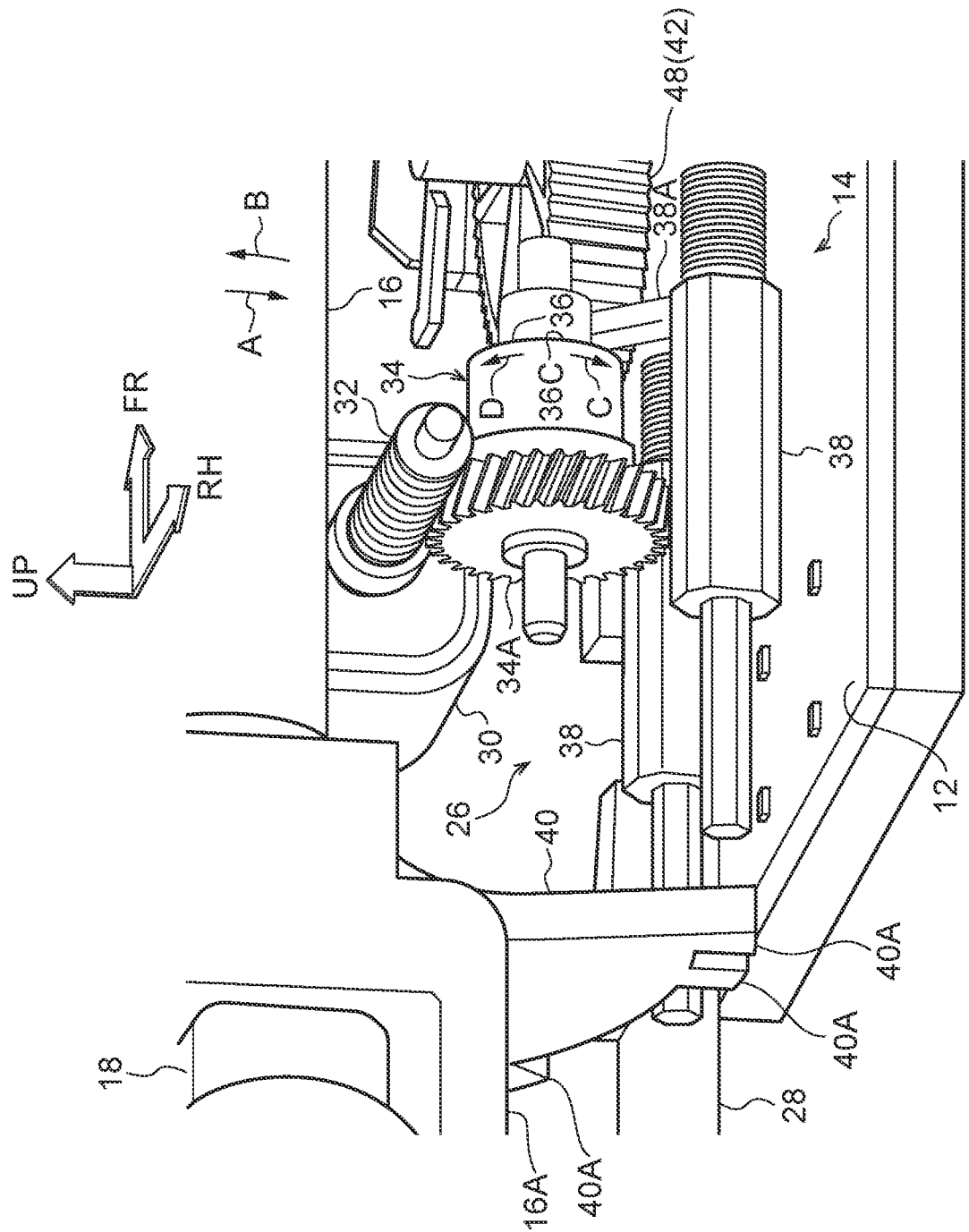
FIG. 4 is a perspective view illustrating a locking device and the like of a shift device according to an exemplary embodiment of the present disclosure, as viewed from the oblique rear right.

A locking device 26 (see FIG. 4) serving as a restriction device is provided at the periphery of a rear portion of the rotation shaft 16.

The locking device 26 is provided with an actuation frame 28 with a substantially U-shaped frame profile, serving as an actuation section and a moving section. The actuation frame 28 is disposed on the left side and lower side of the rear portion of the rotation shaft 16. The actuation frame 28 is capable of sliding (moving) in the front-rear direction, and the actuation frame 28 is restricted from moving in the up-down direction and left-right direction. The actuation frame 28 is urged toward the rear side and abuts a left end of the lever 18 from the front side, such that the left end of the lever 18 is urged toward the rear side by the actuation frame 28, and a right end of the lever 18 is urged toward the front side. Accordingly, when the lever 18 is swing-operated toward the rear side against this urging force at the right end portion, the actuation frame 28 slides against the urging force from a non-operational position at the rear side to an operational position at the front side. Moreover, when the lever 18 is swung to the front side due to the urging force at the right end portion, the actuation frame 28 slides from the operational position to the non-operational position due to the urging force. A lower end portion of the actuation frame 28 is disposed directly above the substrate 12, and the substrate 12 detects a position of the actuation frame 28 (the position of a magnet fixed to the lower end portion of the actuation frame 28).

A lock motor 30, serving as a restriction drive section, is provided at a lower side of the rotation shaft 16 on the right side of the actuation frame 28. The lock motor 30 is electrically connected to the substrate 12, and is driven under the control of the substrate 12. An output shaft of the lock motor 30 projects toward the right, and a lock worm 32 is coaxially fixed to the output shaft of the lock motor 30.

A substantially circular column shaped lock cam 34 is provided at a lower side of the lock worm 32. The axial direction of the lock cam 34 is disposed parallel to the front-rear direction. A lock worm wheel 34A is coaxially provided to a rear portion of the lock cam 34, and the lock worm 32 is meshed with the lock worm wheel 34A. Accordingly, when the lock motor 30 is driven and the lock worm 32 is rotated, the lock cam 34 is rotated in a locking direction (the arrow C direction in FIG. 1, etc.) or a release direction (the arrow D direction in FIG. 1, etc.). A cam face 36 is coaxially provided to a front portion of the lock cam 34, the cam face 36 facing toward the front side. The cam face 36 is provided with a locking face 36A, an inclined face 36B, and a release face 36C in this sequence on progression from the release direction side toward the locking direction side. The locking face 36A is disposed at the rear side of the release face 36C, and the inclined face 36B is inclined in a direction toward the front side on progression toward the locking direction.

Substantially rectangular column shaped locking bars 38, each serving as a restriction section and a moving section, are provided on both the left side and right side of the lower side of the lock cam 34. The axial direction of each of the locking bars 38 is disposed parallel to the front-rear direction. The locking bars 38 are capable of sliding (moving) in the front-rear direction, and the locking bars 38 are restricted from moving in the up-down direction and left-right direction. A column shaped engagement portion 38A is integrally provided to a front end of the locking bars 38. The engagement portion 38A extends toward the lock cam 34. The locking bars 38 are urged toward the rear side, and the engagement portion 38A engages with the cam face 36 of the lock cam 34 from the front side. The engagement portion 38A is capable of engaging with the locking face 36A, and with the release face 36C across the inclined face 36B, of the cam face 36 accompanying rotation of the lock cam 34. When the engagement portion 38A is engaged with the locking face 36A, the locking bars 38 are disposed at a locked position (restricted position) at the rear side by an urging force, and when the engagement portion 38A is engaged with the release face 36C, the locking bars 38 are disposed at a released position at the front side, against the urging force.

A detent plate 40 with a substantially sector-form plate-shaped, serving as a restricted section, is provided at the rear side of the locking bars 38. An upper end portion of the detent plate 40 is fixed to the rotation shaft 16. The detent plate 40 is capable of swinging as an integral unit with the rotation of the rotation shaft 16, and a lower face of the detent plate 40 is curved following a swing-circumferential direction of the detent plate 40. The lower face of the detent plate 40 is integrally provided with a predetermined number of rectangular plate shaped locking portions 40A (three in the present exemplary embodiment). The locking portions 40A project toward a swing-radial direction outside of the detent plate 40. When the locking bars 38 are disposed at the locked position, the locking bars 38 abut the locking portions 40A, thereby stopping swinging of the detent plate 40. In this state, rotation of the rotation shaft 16 is stopped, thereby locking (restricting) swinging of the lever 18 (for example swinging from the P position to the R position). When the locking bars 38 are disposed at the released position, the locking bars 38 are not capable of abutting the locking portions 40A, and swinging of the detent plate 40 is not stopped. Accordingly, rotation of the rotation shaft 16 is not stopped, thus permitting (releasing the lock on) swinging of the lever 18.

A drive device 42, serving as a moving device, is provided between the detection device 20 and the locking device 26 at the periphery of the rotation shaft 16.

The drive device 42 is provided with a drive motor 44, serving as a moving drive section. The drive motor 44 is disposed at the lower side of the rotation shaft 16. The drive motor 44 is electrically connected to the substrate 12, and the drive motor 44 is driven under the control of the substrate 12. An output shaft of the drive motor 44 extends toward the rear, and a first worm 46 is coaxially fixed to the output shaft of the drive motor 44.

The first worm 46 is meshed with a first worm wheel 48 on the left side thereof. The axial direction of the first worm wheel 48 is disposed parallel to the up-down direction. A second worm 50 is coaxially coupled to the upper side of the first worm wheel 48, and the second worm 50 is capable of rotating as an integral unit with the first worm wheel 48.

A second worm wheel 52 with a substantially sector-form plate-shaped, serving as a drive section and a moving section, is meshed with the right side of the second worm 50. The second worm wheel 52 is supported by the rotation shaft 16 so as to be capable of swinging (moving), and the second worm wheel 52 is restricted from moving in the front-rear direction with respect to the rotation shaft 16. The second worm wheel 52 is restricted from rotating by the first worm 46, the first worm wheel 48, and the second worm 50, and the second worm wheel 52 is disposed at a reference position (reference movement position). When the drive motor 44 is driven, the first worm 46, the first worm wheel 48, and the second worm 50 are rotated, thereby rotating the second worm wheel 52. A triangular column shaped rotation projection 52A is integrally provided to an upper portion of a front face of the second worm wheel 52. The rotation projection 52A projects toward the front side. The rotation projection 52A is separated from and is at the forward direction side of the rotating plate 22A of the rotating gear 22 of the detection device 20, and the rotating plate 22A is not capable of abutting the rotation projection 52A, even when the rotating plate 22A swings due to the lever 18 being swung in a range from the P position to the D position.

A first helical gear 54 is provided at a rear side of the second worm wheel 52. The first helical gear 54 is rotatably supported by the rotation shaft 16, and is restricted from moving in the front-rear direction with respect to the rotation shaft 16. The first helical gear 54 is integral with the second worm wheel 52, and the first helical gear 54 rotates as an integral unit with swinging of the second worm wheel 52.

A second helical gear 56 is meshed with the right side of the first helical gear 54. The axial direction of the second helical gear 56 is disposed parallel to the up-down direction, and the second helical gear 56 is rotated by rotation of the first helical gear 54. A lower end portion of the second helical gear 56 is disposed directly above the substrate 12, and the substrate 12 detects a rotation position of the second helical gear 56 (a rotation position of a magnet fixed to the lower end portion of the second helical gear 56), thereby detecting a rotation position of the first helical gear 54, and detecting a swing position of the second worm wheel 52.

Explanation follows regarding operation of the present exemplary embodiment.

In the shift device 10 configured as described above, the lever 18 is swing-operated in the up-down direction so as to be placed at the P position, the R position, the N position, or the D position. As the lever 18 is swung in the up-down direction, the rotating gear 22 rotates as an integral unit with the lever 18 and the rotation shaft 16, thereby rotating the detection gear 24 in the detection device 20. The substrate 12 detects the rotation position of the detection gear 24, and thereby detects the up-down direction swing position of the lever 18.

Moreover, when the lever 18 is swing-operated toward the rear side, the actuation frame 28 of the locking device 26 slides from the non-operational position side to the operational position against the urging force. When the lever 18 is not swing-operated toward the rear side (when the swing-operation of the lever 18 toward the rear side is released), the actuation frame 28 slides from the operational position side to the non-operational position due to the urging force.

In a state in which the brake has been operated while the lever 18 is disposed at the P position, if the lever 18 is not swing-operated toward the rear side (if the substrate 12 has detected that the actuation frame 28 has slid to the non-operational position), the lock motor 30 of the locking device 26 is driven under the control of the substrate 12, such that the lock cam 34 is rotated in the locking direction (arrow C direction) through the lock worm 32, thereby disposing the locking bars 38 at the locked position (the drive of the lock motor 30 under the control of the substrate 12 being ended when the substrate 12 has detected that the locking bars 38 have slid to the locked position). Accordingly, the locking bars 38 abut the locking portions 40A of the detent plate 40, stopping the detent plate 40 from swinging, and thereby stopping rotation of the rotation shaft 16 and locking swinging of the lever 18 from the P position toward the R position side.

In a state in which the brake has been operated while the lever 18 is disposed at the P position, if the lever 18 is swing-operated toward the rear side (if the substrate 12 has detected that the actuation frame 28 has slid to the operational position), the lock motor 30 of the locking device 26 is driven under the control of the substrate 12, such that the lock cam 34 is rotated in the release direction (arrow D direction) through the lock worm 32, thereby disposing the locking bars 38 at the released position (the drive of the lock motor 30 under the control of the substrate 12 being ended when the substrate 12 has detected that the locking bars 38 have slid to the released position). Accordingly, since the locking bars 38 are not capable of abutting the locking portions 40A of the detent plate 40, the detent plate 40 is not stopped from swinging and the rotation shaft 16 is not stopped from rotating, thereby permitting the lever 18 to be swung from the P position to the R position side.

In a state in which the lever 18 is disposed at a shift position other than the P position, if the lever 18 is not swing-operated toward the rear side (if the substrate 12 has detected that the actuation frame 28 has slid to the non-operational position), the lock motor 30 of the locking device 26 is driven under the control of the substrate 12, such that the lock cam 34 is rotated in the locking direction (arrow C direction) through the lock worm 32, thereby disposing the locking bars 38 at the locked position (the drive of the lock motor 30 under the control of the substrate 12 being ended when the substrate 12 has detected that the locking bars 38 have slid to the locked position). Accordingly, the locking bars 38 abut the locking portions 40A of the detent plate 40, stopping the detent plate 40 from swinging, and thereby stopping the rotation shaft 16 from rotating and locking swinging of the lever 18.

In a state in which the lever 18 is disposed at a shift position other than the P position, if the lever 18 is swing-operated toward the rear side (if the substrate 12 has detected that the actuation frame 28 has slid to the operational position), the lock motor 30 of the locking device 26 is driven under the control of the substrate 12, such that the lock cam 34 is rotated in the release direction (arrow D direction) through the lock worm 32, thereby disposing the locking bars 38 at the released position (the drive of the lock motor 30 under the control of the substrate 12 being ended when the substrate 12 has detected that the locking bars 38 have slid to the released position). Accordingly, the locking bars 38 are not capable of abutting the locking portions 40A of the detent plate 40, the detent plate 40 is not stopped from swinging, and the rotation shaft 16 is not stopped from rotating, thereby permitting the lever 18 to be swung.

In a state in which the lever 18 is not disposed at the P position, at a predetermined occasion (for example when the vehicle engine is switched off), the lock motor 30 of the locking device 26 is driven under the control of the substrate 12, such that the lock cam 34 is rotated in the release direction (arrow D direction) through the lock worm 32, thereby disposing the locking bars 38 at the released position (drive of the lock motor 30 under the control of the substrate 12 being ended when the substrate 12 has detected that the locking bars 38 have slid to the released position).

Then, the drive motor 44 of the drive device 42 is driven under the control of the substrate 12, such that the second worm wheel 52 is swung in the reverse direction (arrow B direction) through the first worm 46, the first worm wheel 48, and the second worm 50. The rotation projection 52A of the second worm wheel 52 thereby presses the rotating plate 22A of the rotating gear 22, causing the rotating gear 22 to rotate in the reverse direction. Accordingly, the rotation shaft 16 is rotated in the reverse direction so as to swing (return) the lever 18 to the P position.

When the lever 18 has been disposed at the P position (when the substrate 12 has detected using the detection device 20 that the lever 18 has been swung to the P position), the drive motor 44 is driven under the control of the substrate 12, such that the second worm wheel 52 is swung in the forward direction (arrow A direction) through the first worm 46, the first worm wheel 48, and the second worm 50, thereby swing (return) the second worm wheel 52 to the reference position. While the second worm wheel 52 is being swung, the second helical gear 56 is rotated by the second worm wheel 52 through the first helical gear 54, and the substrate 12 detects the rotation position of the second helical gear 56 to detect the rotation position of the second worm wheel 52. Drive of the drive motor 44 under the control of the substrate 12 is thereby ended when the second worm wheel 52 is detected to have swung to the reference position.

As described above, the rotation position of the rotation shaft 16, the slide position of the actuation frame 28, the slide position of the locking bars 38, and the swing position of the second worm wheel 52 are all detected by the same substrate 12. This thereby enables the rotation position of the rotation shaft 16, the slide position of the actuation frame 28, the slide position of the locking bars 38, and the swing position of the second worm wheel 52 to be detected by a simple configuration.

Moreover, the axial direction of the rotation shaft 16 is disposed parallel to the front-rear direction, the substrate 12 is disposed perpendicular to the up-down direction, and the substrate 12 is disposed parallel to the center axis line of the rotation shaft 16. Accordingly, unlike in cases in which the center axis line of the rotation shaft 16 is disposed perpendicular to the substrate 12, a placement dimension in the direction in which the substrate 12 and the rotation shaft 16 oppose each other (the up-down direction) can be made smaller.

Moreover, the lever 18 is swung in the up-down direction to rotate the rotation shaft 16. Accordingly, detection of the rotation position of the rotation shaft 16 through the rotating gear 22 and the detection gear 24 by the substrate 12 enables the up-down direction swing position of the lever 18 to be detected, thus enabling the shift position of the lever 18 to be detected.

Moreover, the rotation shaft 16 is linked to the rotating gear 22 and the detection gear 24, each configured by a helical gear. Accordingly, even in cases in which the substrate 12 is disposed parallel to the center axis line of the rotation shaft 16, the center axis line of rotation of the detection gear 24 can be disposed perpendicular to the substrate 12, enabling the substrate 12 to make accurate detection of the rotation position of the detection gear 24, and thereby enabling accurate detection of the rotation position of the rotation shaft 16.

Moreover, a rotation angle of the detection gear 24 is magnified, with respect to a rotation angle of the rotation shaft 16, by the rotating gear 22 and the detection gear 24. Accordingly, the precision with which the rotation position of the rotation shaft 16 is detected can be raised by detecting the rotation position of the detection gear 24 using the substrate 12, thereby enabling the precision with which the up-down direction swing position of the lever 18 is detected to be raised.

Moreover, the substrate 12 detects the swing position of the second worm wheel 52 through the first helical gear 54 and the second helical gear 56. This enables the swing position of the second worm wheel 52 to be detected even in cases in which the second worm wheel 52 swings separately to the lever 18, the rotation shaft 16, and the rotating gear 22.

Moreover, the second worm wheel 52 is linked to the first helical gear 54 and the second helical gear 56. Accordingly, even in cases in which the substrate 12 is disposed parallel to the center axis line of swinging of the second worm wheel 52, the center axis line of rotation of the second helical gear 56 can be disposed perpendicular to the substrate 12, enabling the substrate 12 to make accurate detection of the rotation position of the second helical gear 56, thereby enabling accurate detection of the swing position of the second worm wheel 52.

Moreover, a rotation angle of the second helical gear 56 is magnified, with respect to a swing angle of the second worm wheel 52, by the first helical gear 54 and the second helical gear 56. Accordingly, the precision with which the swing position of the second worm wheel 52 is detected can be raised by detecting the rotation position of the second helical gear 56 using the substrate 12.

Moreover, the actuation frame 28 slides when the lever 18 is swung in the front-rear direction. Accordingly, the front-rear direction swing position of the lever 18 can be detected by detecting the slide position of the actuation frame 28 using the substrate 12.

The locking bars 38 slide to either lock or permit swinging of the lever 18 through the detent plate 40. Accordingly, whether swinging of the lever 18 is locked or permitted can be detected by detecting the slide position of the locking bars 38 using the substrate 12.

Moreover, since the actuation frame 28 slides when the lever 18 is swung in the front-rear direction, the locking bars 38 slide driven by the lock motor 30 to either lock or permit swinging of the lever 18. Accordingly, there is no need to provide a switch to drive the lock motor 30 at the right end portion (leading end portion) of the lever 18. This enables an increase in the degrees of freedom for design of the lever 18, and also eliminates the need for a harness connected to such a switch. Moreover, there is no need to operate such a switch in addition to performing an up-down direction swing operation of the lever 18. Since up-down direction and front-rear direction swing operations of the lever 18 suffice, the degrees of freedom of operation of the lever 18 can be increased.

Note that in the present exemplary embodiment, the drive device 42 swings the lever 18 to the P position. However, configuration may be made in which the drive device 42 swings the lever 18 to a predetermined shift position other than the P position (for example the N position).

Moreover, in the present exemplary embodiment, the lever 18 (shift body) is swung. However, configuration may be made in which the shift body is rotated or slid about its center axis line.

Moreover, in the present exemplary embodiment, the rotation shaft 16 is the only rotation section provided to the shift mechanism 14. However, configuration may be made in which plural rotation sections are provided to the shift mechanism 14.

Moreover, in the present exemplary embodiment, the lever 18 (shift body) does not configure a rotation section or a moving section, and the position of the lever 18 (shift body) is not detected by the substrate 12. However, the shift body may configure a rotation section or a moving section, and the position of the shift body may be detected by the substrate 12.

Moreover, in the present exemplary embodiment, the shift device 10 is installed to the steering column. However, configuration may be made in which the shift device 10 is installed to a vehicle cabin floor, an instrument panel, or a console.

What is claimed is:

1. A shift device comprising:
   a shift mechanism that is provided with a shift body including an elongated lever that is movable to change a shift position;
   at least one rotation section that is provided at the shift mechanism and that is rotated about a center axis line of the rotation section;
   at least one moving section that is provided at the shift mechanism and that is moved; and
   a detection body that detects a rotation position of the rotation section and detects a movement position of the moving section,
   wherein the detection body is a substantially rectangular plate-shaped substrate that includes position sensors, and the shift mechanism is provided on an upper side of the detection body,
   wherein the shift body is movable to rotate the rotation section about the center axis line,
   wherein the elongated lever of the shift body is movable around a first axis to change the shift position of the shift body, and is movable around a second axis to move the moving section, and
   wherein the substantially plate-shape substrate of the detection body is disposed parallel to the center axis line of the rotation section, and
   wherein the shift device is configured to be installed to a steering column of a vehicle, and the elongated shift lever of the shift body includes a proximal end that is pivotally moveable around the first and second axes with respect to both the steering column and the detection body.

2. The shift device of claim 1, wherein the moving section is movable to move the shift body.

3. The shift device of claim 1, wherein the moving section is movable to restrict movement of the shift body.

4. The shift device of claim 1, wherein the detection body is disposed directly below the shift mechanism.

* * * * *